United States Patent Office 3,686,048
Patented Aug. 22, 1972

3,686,048
FIBER REINFORCED PARALLEL RESINOUS STRUCTURE FABRICATION
Joseph F. Schirtzinger, Pasadena, Calif., assignor to Air Logistics Corporation, Pasadena, Calif.
No Drawing. Filed Oct. 14, 1969, Ser. No. 866,363
Int. Cl. B32b 7/14
U.S. Cl. 156—161                          10 Claims

ABSTRACT OF THE DISCLOSURE

Interconnecting parallel fibers with resin bridges to maintain true fiber parallelism during the fabrication of multilayer fiber reinforced structures.

BACKGROUND OF THE INVENTION

The present invention relates to the preparation of truly parallel fiber reinforced structures.

Fiber reinforced materials, which occur in nature as woods and grasses, such as cane and bamboo, are excellent natural structural materials. They possess a high ratio of strength to weight due to the presence of long, thin fibers of lignin held together with a resinous matrix. This material has many advantages over homogeneous materials used for the same purpose. The fibers are generally parallel and tied together by a matrix which transfers loads laterally from one fiber to another. In the event one or more fibers break due to imperfections, the stresses are transferred to adjacent fibers which remain intact. Due to this action fiber reinforced materials resist catastrophic failure which frequently occurs in homogeneous materials, such as glass or tempered steel.

In an effort to produce stronger and lighter materials than those available naturally, natural and synthetic fibers have been bonded by natural and synthetic matrices. Excellent results have been obtained using glass, boron, carbon and monocrystalline metallic fibers in polymeric, ceramic and metallic matrices.

The strength of the final product, however, is greatly influenced by the extent the high strength fiber material is both straight and parallel. This is because the reinforcing fibers have strengths ranging from 300,000 pounds per square inch to more than 1,000,000 pounds per square inch, whereas the binding matrix usually has strengths only from about 10,000 to about 20,000 pounds per square inch. Any load applied to the final composition should be mainly resisted by the high strength fibers. If they are other than straight and parallel in the direction of the component of the applied force the force is resisted mainly by the matrix material which may easily rupture due to its inherently lower strength. Ruptures transfer the load unequally to the exposed fibers resulting in successive rupture of exposed fibers due to overload and internal abrasion which results in ultimate structural failure.

In the case of glass fiber reinforced plastics, strength of materials made using chopped fibers is normally low due to the short length of the fibers used. Glass fiber reinforced laminates have been made from woven roving or fabric materials but are also of comparatively low strength relative to the fibers themselves, because the over and under wrap and weave pattern produced a sinusoidal excess within the glass fibers which, under tension, tend to straighten and the fibers transfer the stress to the resin matrix.

The use of filament-wound glass fiber reinforced plastic materials provides a structural material exhibiting a marked increase in strength, as much as several hundred percent over chopped or resin reinforced plastics. Increase in strength is primarily due to the fact that the fibers are wound under tension and are, therefore, straight and usually parallel since the materials used for filament winding are straight roving fibers.

To manufacture end products, such as sheets, tubes, angles, channels, and the like, of fiber reinforced plastics, the reinforcing fibers can also be laid down onto a surface under tension to keep all the fibers parallel. If, however, strength is required in more than one direction, a laminate must be to provide successive layers of parallel fibers facing in the direction of applied loads.

Continuous reinforced fibers, however, are usually supplied in spools, or similar arrangements, where time has allowed the fiber to "set" or "marcel" which tends to leave a fiber with a helical or sinusoidal memory. While a group of fibers may be kept in parallel tension during resin coating operations normally employed, the fibers will remain straight and parallel only as long as tension is maintained. If several layers of fibers are to be superimposed to provide multi-directional high strength, no convenient way has been devised to keep fibers straight and under tension.

Applications of a binder in a volatile solvent, which leaves a residual film of partially cured resins on the fiber, have been tried. Shortcomings exist, however, in that the binder resin normally produced a continuous film over some of the fiber strands which prevents the subsequently applied resin matrix from totally wetting the individual filaments in a strand of roving. Also, the resin binder is not usually strong enough to keep the fibers from separating during handling. In addition, it has not been practical to fully impregnate a series of layers of parallel fibers since capillary flow is retarded. If re-fluidization of the resin is sought to overcome this problem, fibers tend to wash from their parallel relation to form a wavy configuration as their release from tension permits a release of memory stresses and a return to their "marcelled" sinusoidal form.

SUMMARY OF THE INVENTION

It has now been found that the fabrication of fiber reinforced matrices containing truly parallel fibers can be enhanced by forming a pre-ply layer or layers of parallel fibers bound together in some tension with a plurality of resinous bridges. This is accomplished by distributing over a tensioned web of parallel fibers a measured quantity of finely divided particulate resin, passing the web under tension through a heating zone which causes the particles to melt and established bridging adhesive contact between two or more adjacent filaments, then setting the resin bridges before releasing tension. The resultant pre-ply structure is essentially an open lattice-work of parallel fibers maintained under internal tension which provides pre-established passageways for the subsequent flow of filling matrix materials when a single or multilayer, parallel fiber reinforced structure is fabricated.

DESCRIPTION

According to the present invention, there is provided a parallel fiber, pre-ply for the construction of fiber reinforced structures in which parallel fibers are maintained in parallel relationship under some tension by resinous bridges which prevent disruption of the parallel relationship during the subsequent fabrication of a fiber reinforced structure.

As used herein the term "resin" includes inorganic and organic materials which are compatible with and adhesive to the fibers and which are normally solid at room temperature and meet at a temperature below the melting point of the fibers.

The truly parallel fiber structures of this invention are fabricated generally by creating a web of parallel fibers, maintaining the parallel fibers under some tension, distributing resin particles over the surface of the parallel fibers, passing the web through one or more heating zones to cause the fiber resin particles to melt and form bridging adhesive contacts between at least adjacent filaments, then setting the resin bridges before releasing applied tension to establish a parallel fiber structure, in which the fibers are held by internal tension forces in parallel relationship and which resist return to random "marcel" forms.

While the practice of this invention is applicable to the preparation of bridged structures from any fiber material, it is readily explained in terms of the preparation of parallel fiber structures of glass fibers. A web of straight parallel fibers is typically established, according to the present invention, by mounting the required number of spools of glass fibers necessary to create a web of desired width and thickness on a rack or creel from which individual strands are drawn under some tension to form the web. These glass fiber filaments are typically precoated with a sizing liquid containing a protective material for the glass surface and a suitable coupling agent for proving mutual adhesion between the glass and the resin matrix to be applied.

There is then uniformly distributed over the web of straight parallel fibers a measured quantity of particulate resin material. The amount of particulate resin material distributed is not narrowly critical, but must be sufficient to provide, when heated, enough spaced capillary bridges between contacting surfaces of the cylindrical parallel fibers to introduce structure integrity among the group of fibers but less than the amount of resin which would wet all of the contacting cylindrical surfaces between the fibers. Preferably the amount of particulate resin applied should be sufficient to create spaced capillary bridges between about 50 percent or less of contacting cylindrical surface areas of the fibers. Since the resin particles will flow between adjacent fibers when heated and ideally only provided minute bridges, the amount of resin required per total unit area of web will be substantially less than the total contact area between adjacent cylindrical fibers which comprise the web.

Application of the particulate resin particles may be manual, as, for instance, using a shaker, and mechanical, as, for instance, passing the web through a zone where particulate resin is maintained under free flowing, fluidized bed conditions at a rate sufficient to cause collection of the desired quantity of resin particles. Electrical deposition is also feasible since the fibers normally do have a surface charged. Particulate resin particles may be deposited on the surface with neutralization of surface charge using apparatus such as an Oxy-Dry sprayer, which is commonly use for the deposition of starch particles in the offset printing industry.

The resin particles distributed may be thermosetting or thermoplastic and may be identical to or similar to or dissimilar to the matrix to be eventually applied. The resin particles should, however, be sufficiently compatible with the matrix system so that adhesion at the point of bridgement will be enjoyed.

Illustrative, but no wise limiting, of the particulate thermoplastic resins which may be applied, there may be mentioned acetal resins; acrylic resins, such as methyl methacrylate, methyl methacrylate-styrene copolymers; amide polymers; cellulosic resin; ethylene polymers, such as polyethylene, ethylene-vinyl chloride copolymers, and ethylene norbornene copolymers; propylene polymers, such as polypropylene and ethylene-propylene copolymers; polycarbonates; polyethers; polysulfones; polyurethanes; styrene polymers, such as acrylonitrile-styrene butadiene complexes; vinyl polymers, such as polyvinyl chloride, polyvinyl acetate, and like thermoplastics commonly used as matrix for fiber reinforced systems.

Illustrative, but no wise limiting, of the thermosetting polymers which may be applied are normally solid curable epoxy resins, such as those based on bisphenol "A" and epoxidized cyclopentadiene; phenol-formaldehyde resins; diallyl phthalate resins; melamine-formaldehyde resins; phenol-furfural resins; silicone resins; urethane resins and like thermosetting resins used as a matrix in fiber reinforced structures.

The web and the applied resin particles are then heated to allow the resin particles to melt and establish adhesive bridge sites between two or more adjacent parallel fibers. The bridge sites are then set to establish the parallel fiber lattice-work of this invention.

In the instance of the use of thermoplastic resins, setting is achieved by mere cooling of the resin bridges before fiber tension is released. In the instance of thermosetting resins, the bridges are allowed to cure for a time sufficient, depending on the thermosetting material used, for the cross-linking reaction normally associated with the thermosetting resin used to occur.

Once resin bridges are set and established, the tension applied to the fibers may be released. In the instance of a continuous operation, where the parallel fiber lattice-work preform of this invention is prepared continuously, the resultant sheet may then be cut into whatever shapes will be required for the subsequent construction by the fiber reinforced structures.

The result of the operation is a normally flexible structure in which the parallel fibers are joined to other fibers to form a strand of roving by random and intermittent adhesive bridges that maintain structural integrity while at the same time permitting access of a liquid matrix resin into the interfilamentary spaces. The resin bridges prevent lateral movement of the filaments caused by "washing" of liquid resin in subsequent pressing and molding operations and thereby serve to produce a superior laminate having parallel reinforcements in each of its reinforcing layers.

Because only a small amount of resin is actually used to bind the parallel fibers, the resultant roving remains flexible and is adaptive to be formed into any desired shape. To prepare a reinforced fiber structure from the bridge web preform simply requires a buildup on a work surface of a desired number of fiber layers arranged in the directions of estimated or determined force vectors. One or more mats may be laid, in line, at right angles or at any angle therebetween. Once the desired number of mats have been assembled on the work surface, a liquid resin matrix is then applied and allowed to flow through the interfilamentary spaces to completely wet all of the fibers contained in the assembly. The assembly is then typically pressed and cooled in the instance of application of a thermoplastic matrix or allowed to pass through a cure cycle in the instance of a thermosetting matrix. Although it is preferred that the thermoplastic or the thermosetting resin be identical to the resin used in preparation of the bridges, its use is not mandatory so long as the resultant matrix shows some degree of compatibility with the resin bridges in order that point sources of weakness will not be established.

For example, a glass fiber reinforced tube of unusual axial strength may be fabricated by rolling an elongated web with fibers in the axial direction around a mandril, then applying a resin matrix.

A tube of proportioned axial and radial strengths may similarly be constructed from a fairly thin continuous web by wrapping them around a mandril at some desired angle to the axis of the mandril, then applying the resin matrix. The angle will, of course, determine the relative axial and radial strengths of the tube.

Although the process of this invention has been described in terms of fabrication of glass fiber reinforced structures, it is to be understood that the fabrication of fiber reinforced structures from other materials, such as ceramics, metals and single crystals, is anticipated within the ambit of this invention.

Also included within the ambit of this invention is the use of other matrix systems, such as ceramics, homogeneous metals, structural foams and the like.

What is claimed is:

1. A process for preparing parallel fiber structures which comprises:
   (a) forming a tensioned web of closely spaced parallel fibers;
   (b) distributing over said web a quantity of particulate resin particles;
   (c) heating said resin particles to above their melting point to establish a multiplicity of spaced bridging adhesive contacts between fibers which comprise the web; and
   (d) setting the spaced resinous bridges before releasing tension.

2. A process as claimed in claim 1 in which the amount of particulate resin applied is sufficient to establish bridging contact between up to 50 percent of adjacent fiber surfaces.

3. A process as claimed in claim 1 in which the fiber is glass fiber.

4. A process as claimed in claim 1 in which the resin is a thermoplastic.

5. A process as claimed in claim 3 in which the resin is a thermoplastic.

6. A process as claimed in claim 1 in which the resin is thermosetting.

7. A process as claimed in claim 3 in which the resin is thermosetting.

8. A process as claimed in claim 6 in which the resin is a thermosetting epoxy.

9. A process as claimed in claim 7 in which the resin is a thermosetting epoxy resin.

10. A process for the preparation of fiber reinforced resin structures where fibers are positioned in parallel relation which comprises,
   (a) forming a tensioned web of closely spaced parallel fibers;
   (b) distributing over said web a quantity of particulate resin particles;
   (c) heating said resin particles to above their melting point to establish a multiplicity of spaced bridging adhesive contacts between fibers which comprise the web;
   (d) setting the spaced resinous bridges before releasing tension; and
   (e) adding to at least one web of closely spaced parallel fibers containing the spaced resinous bridges a liquified binding resin to fill the voids between the resinous bridges and solidifying the binding resin.

References Cited

UNITED STATES PATENTS

| | | | |
|---|---|---|---|
| 2,778,764 | 1/1967 | Morrison | 156—296 X |
| 3,022,210 | 2/1962 | Phillipps | 156—180 |
| 3,467,564 | 9/1969 | Daugherty et al. | 156—161 X |
| 2,794,759 | 6/1957 | Dildilian | 156—62.2 X |
| 3,481,802 | 12/1969 | Marcell | 156—161 X |
| 2,854,815 | 10/1960 | Kuts | 156—161 X |

BENJAMIN R. PADGETT, Primary Examiner

P. A. NELSON, Assistant Examiner

U.S. Cl. X.R.

156—296; 161—78, 144, DIG. 4; 264—261, 290

PO-1050
(5/69)

UNITED STATES PATENT OFFICE
CERTIFICATE OF CORRECTION

Patent No. 3,686,048            Dated August 22, 1972

Inventor(s) Joseph F. Schirtzinger

It is certified that error appears in the above-identified patent and that said Letters Patent are hereby corrected as shown below:

In the patent, Col. 2, line 12, the word '"marcel'" should read --"marcelle"--. Col. 3, line 7, the word '"marcel'" should read --"marcelle"--; line 48, the word "charged" should read --charge.--. Col. 3, line 51, the word "use" should read --used--.

Signed and sealed this 6th day of March 1973.

(SEAL)
Attest:

EDWARD M. FLETCHER, JR.            ROBERT GOTTSCHALK
Attesting Officer                    Commissioner of Patents